(12) United States Patent
Höfig et al.

(10) Patent No.: US 10,061,670 B2
(45) Date of Patent: Aug. 28, 2018

(54) METHOD AND APPARATUS FOR AUTOMATICALLY GENERATING A COMPONENT FAULT TREE OF A SAFETY-CRITICAL SYSTEM

(71) Applicants: Kai Höfig, München (DE); Marc Zeller, München (DE)

(72) Inventors: Kai Höfig, München (DE); Marc Zeller, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/981,673

(22) Filed: Dec. 28, 2015

(65) Prior Publication Data

US 2017/0185470 A1 Jun. 29, 2017

(51) Int. Cl.
*G06F 11/22* (2006.01)
*G06F 11/07* (2006.01)
*G06F 17/30* (2006.01)

(52) U.S. Cl.
CPC ........ *G06F 11/2257* (2013.01); *G06F 11/079* (2013.01); *G06F 11/0736* (2013.01);
(Continued)

(58) Field of Classification Search
CPC ............... G06F 11/079; G06F 11/0736; G06F 11/0751; G06F 11/2252; G06F 11/2257
See application file for complete search history.

(56) References Cited

U.S. PATENT DOCUMENTS

| | | | | |
|---|---|---|---|---|
| 4,870,575 A | * | 9/1989 | Rutenberg | G06F 11/00 716/136 |
| 5,369,756 A | * | 11/1994 | Imura | G06F 11/321 706/914 |

(Continued)

OTHER PUBLICATIONS

Vesely W, Stamatelalos M, Dugan J, Fragola J, Minarick J. Fault tree handbook with aerospace applications. Report by NASA Office of Safety and Mission Assurance. 2002 [retrieved on Nov. 23, 2016]. Retrieved from the Internet: <URL: http://www.hq.nasa.gov/office/codeq/doctree/fthb.pdf>.*

(Continued)

*Primary Examiner* — Matthew M Kim
*Assistant Examiner* — Paul Contino
(74) *Attorney, Agent, or Firm* — Lempia Summerfield Katz LLC (57) ABSTRACT

An apparatus includes an input that receives a continuous function chart for each component of the investigated safety-critical system. A processor generates a corresponding component fault tree element. Inports and outports of the component fault tree element are generated and interconnected based on unique names of the inputs and outputs of the corresponding continuous function chart of the respective system component. Input failure modes and output failure modes are generated based on generic mapping between connector types of the continuous function chart and failure types of failure modes of the component fault tree element. The input failure modes of a component fault tree element are connected to output failure modes of the component fault tree element via internal failure propagation paths based on interconnected function blocks of the continuous function chart of the respective system component. An output outputs the generated component fault tree of the safety-critical system.

14 Claims, 6 Drawing Sheets

(52) U.S. Cl.
CPC ...... *G06F 11/0769* (2013.01); *G06F 11/2252* (2013.01); *G06F 11/0721* (2013.01); *G06F 17/30312* (2013.01)

(56) References Cited

U.S. PATENT DOCUMENTS

| | | | | |
|---|---|---|---|---|
| 5,581,694 | A * | 12/1996 | Iverson | G06F 11/2257 706/53 |
| 7,681,086 | B2 * | 3/2010 | Vlassova | G06F 17/5009 700/177 |
| 8,364,626 | B2 * | 1/2013 | Heilmann | G05B 23/0248 706/47 |
| 9,311,434 | B1 * | 4/2016 | Berg | G06F 17/5009 |
| 2003/0028823 | A1 * | 2/2003 | Kallela | G05B 23/0248 714/26 |
| 2005/0160324 | A1 * | 7/2005 | Przytula | G06N 7/005 714/43 |
| 2007/0150772 | A1 * | 6/2007 | Berenbach | G06F 11/2257 714/25 |
| 2007/0225948 | A1 * | 9/2007 | Takezawa | G06F 17/50 703/1 |
| 2010/0100251 | A1 * | 4/2010 | Chao | G05B 23/0245 700/292 |
| 2012/0096318 | A1 * | 4/2012 | Kaiser | G06F 11/0718 714/38.1 |
| 2013/0024417 | A1 * | 1/2013 | Joanni | G06N 7/005 706/59 |
| 2013/0073271 | A1 * | 3/2013 | Xiang | G05B 23/0248 703/6 |
| 2013/0317780 | A1 * | 11/2013 | Agarwal | G05B 23/0248 702/181 |
| 2015/0067400 | A1 * | 3/2015 | Ishii | G06F 11/079 714/37 |
| 2015/0142402 | A1 * | 5/2015 | Ramesh | G06F 17/5009 703/7 |
| 2016/0266952 | A1 * | 9/2016 | Hofig | G06F 11/079 |

OTHER PUBLICATIONS

Vesely W. Fault Tree Analysis (FTA): Concepts and Applications. 1998 [retrieved on Nov. 23, 2016]. Retrieved from the Internet: <URL: http://www.hq.nasa.gov/office/codeq/risk/ftacourse.pdf>. pp. 179-181.*

Kaiser B, Liggesmeyer P, Mackel O. A New Component Concept for Fault Trees. Oct. 1, 2003. In Proceedings of the 8th Australian Workshop on Safety Critical Systems and Software. vol. 33. pp. 37-46.*

Williamson, Louise M. Analysis of safety critical plc code against IEC 1508 development techniques, Durham theses, Durham University. 1998.*

Dugan, Joanne Bechta, Salvatore J. Bavuso, and Mark A. Boyd. "Dynamic fault-tree models for fault-tolerant computer systems." IEEE Transactions on reliability 41.3 (1992): 363-377. (Year: 1992).*

Wardana, Awang Ni, Jens Folmer, and Birgit Vogel-Heuser. "Automatic program verification of continuous function chart based on model checking." Industrial Electronics, 2009. IECON'09. 35th Annual Conference of IEEE. IEEE, 2009. (Year: 2009).*

Soliman, Doaa, Kleanthis Thramboulidis, and Georg Frey. "Transformation of function block diagrams to Uppaal timed automata for the verification of safety applications." Annual Reviews in Control 36.2 (2012): 338-345. (Year: 2012).*

* cited by examiner

METHOD AND APPARATUS FOR AUTOMATICALLY GENERATING A COMPONENT FAULT TREE OF A SAFETY-CRITICAL SYSTEM

TECHNICAL FIELD

The present embodiments relate to a method and apparatus for generating automatically a component fault tree of a safety-critical system on the basis of continuous function charts of system components of the respective safety-critical system.

TECHNICAL BACKGROUND

Safety-critical systems may be found in a wide range of technical domains such as aerospace, transport systems, healthcare systems, automotive systems and industrial automation systems. With the growing system complexity of such safety-critical systems, also the need for safety assessment of the safety-critical system is increasing in order to meet the high quality demands in these technical domains. The goal of a safety assessment process is to identify all failures that cause hazardous situations and to demonstrate that the probability of occurrence of such failures is sufficiently low. In the application domains of safety-critical systems, the corresponding safety assurance process may be defined by means of safety standards. The analysis of a safety-critical system may be performed by using bottom-up safety analysis approaches such as failure mode and effect analysis FMEA, or by using top-down safety analysis approaches such as fault tree analysis FTA. By performing a safety analysis it is possible to identify failure modes, their causes and effects having an impact on the system safety. Component fault trees CFTs provide a model- and component-based methodology for fault tree analysis FTA which supports a modular and compositional safety analysis of the respective safety-critical system. Component fault tree elements are related to their development artefacts and may be reused along with the respective development artefact. However, the generation of a component fault tree of a complex safety-critical system may be cumbersome and prone to errors since it is mostly done manually by a safety engineer.

Accordingly, there is a need to provide a method and apparatus for generating automatically a component fault tree of an investigated safety-critical system.

SUMMARY AND DESCRIPTION

The present embodiments provide according to a first aspect a method for generating automatically a component fault tree of a safety-critical system,
the method including the acts of:
providing a continuous function chart for each system component of said safety-critical system and generating for each provided continuous function chart a corresponding component fault tree element,
wherein inports and outports of the component fault tree element are generated and interconnected based on unique names of the inputs and outputs of the corresponding continuous function chart of the respective system component;
generating input failure modes and output failure modes for each generated component fault tree element based on generic mapping between connector types in the continuous function chart and failure types of failure modes of the component fault tree element; and
connecting for each generated component fault tree element of the system component the input failure modes of said component fault tree element to output failure modes of said component fault tree element via internal failure propagation paths based on interconnected function blocks of the continuous function chart of the respective system component.

In a possible embodiment of the method according to the first aspect, the safety-critical system includes software components and/or hardware components.

In a still further possible embodiment of the method according to the first aspect, a fault tree analysis is performed on the basis of the generated component fault tree.

In a still further possible embodiment of the method according to the first aspect, a root cause analysis is performed on the basis of the generated component fault tree.

In a further possible embodiment of the method according to the first aspect, the automatically generated component fault tree is compared with a component fault tree manually created by a software engineer for a verification of the component fault tree.

In a still further possible embodiment of the method according to the first aspect, the component fault tree is generated automatically during runtime of the safety-critical system in response to an observed event.

In a further possible alternative embodiment of the method according to the first aspect, the component fault tree is generated automatically during a design phase of the safety-critical system.

In a further possible embodiment of the method according to the first aspect, the generic mapping is performed by using a generic mapping table stored in a database.

In a further possible embodiment of the method according to the first aspect, the interconnected function blocks of the continuous function chart are read from a function block database.

In a further possible embodiment of the method according to the first aspect, a function block of a continuous function chart stored in said function block database includes at least one automation function representing a logical relation between input parameters and output parameters and/or a dependency of output parameters from input parameters.

The present embodiments further provide according to a second aspect an apparatus for generating automatically a component fault tree of an investigated safety-critical system, said apparatus including:
an input adapted to receive a continuous function chart for each component of the investigated safety-critical system;
a processing unit adapted to generate for each continuous function chart a corresponding component fault tree element, wherein inports and outports of the component fault tree element are generated and interconnected based on unique names of the inputs and outputs of the corresponding continuous function chart of the respective system component,
said processing unit being further adapted to generate input failure modes and output failure modes of each generated component fault tree element based on generic mapping between connector types of the continuous function chart and failure types of failure modes of the component fault tree element and wherein the processing unit is further adapted to connect for each generated component fault tree element of the system component the input failure modes of said component fault tree element to output failure modes of said component fault tree element via internal failure propagation paths based on interconnected function blocks of the continuous function chart of the respective system component; and an output adapted to output the generated component fault tree of said safety-critical system.

In a possible embodiment of the apparatus according to the second aspect, the output component fault tree of the safety-critical system is supplied to an analysis unit adapted to perform a fault tree analysis and/or a root cause analysis on the basis of the component fault tree.

In a possible embodiment of the apparatus according to the second aspect, the processing unit is adapted to generate the component fault tree automatically during runtime of the safety-critical system in response to an observed event.

In a further possible embodiment of the apparatus according to the second aspect, the processing unit is adapted to perform the generic mapping on the basis of a generic mapping table stored in a database.

In a still further possible embodiment of the apparatus according to the second aspect, the processing unit is adapted to read the interconnected function blocks of the continuous function chart from a function block database.

The present embodiments further provide according to a third aspect a safety-critical system including an apparatus configured to generate automatically a component fault tree of the safety-critical system, said apparatus including:

an input adapted to receive a continuous function chart for each component of the safety-critical system, a processing unit adapted to generate for each continuous function chart a corresponding component fault tree element, wherein inports and outports of the component fault tree element are generated and interconnected based on unique names of the inputs and outputs of the corresponding continuous function chart of the system component, said processing unit of said apparatus being further adapted to generate input failure modes and output failure modes for each generated component fault tree element based on generic mapping between connector types in the continuous function chart and failure types of failure modes of the component fault tree element, wherein the processing unit of said apparatus is further adapted to connect for each generated component fault tree element of the system component the input failure modes of said component fault tree element to output failure modes of said component fault tree element via internal failure propagation paths based on interconnected function blocks of the continuous function chart of the respective system component.

In a possible embodiment of the safety critical system according to the third aspect, the processing unit is adapted to generate and evaluate the component fault tree of the safety-critical system during runtime of the safety-critical system in response to an observed failure of a system component of said safety-critical system.

BRIEF DESCRIPTION OF THE DRAWINGS

In the following, possible embodiments of the different aspects are described in more detail with reference to the enclosed figures.

DETAILED DESCRIPTION

Figure 1:
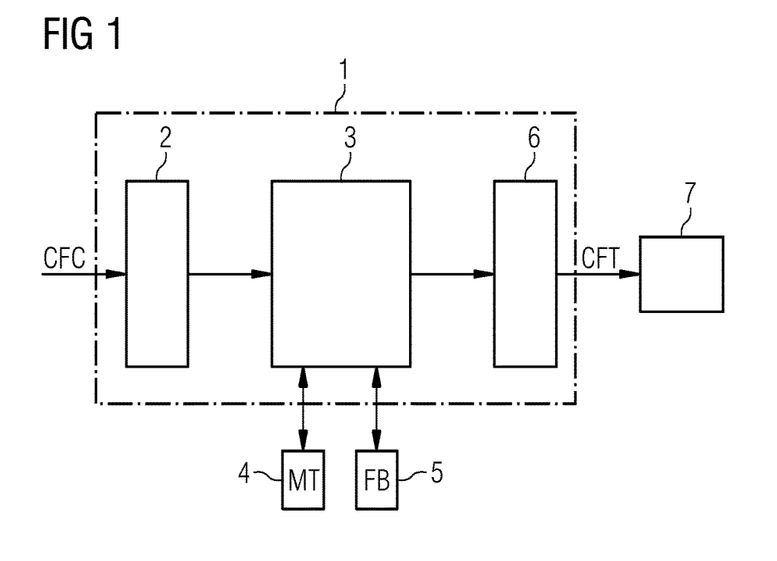
FIG. 1 shows a block diagram of a possible exemplary embodiment of an apparatus for generating automatically a component fault tree of an investigated safety-critical system according to an aspect.

FIG. 1 shows an exemplary embodiment of an apparatus 1 for generating automatically a component fault tree of an investigated safety-critical system SYS according to an aspect. The apparatus 1 is adapted to generate automatically a component fault tree CFT of an investigated safety-critical system SYS. The safety-critical system SYS may include a complex safety-critical system including a plurality of software components and/or hardware components. The apparatus 1 includes an input 2 formed by an interface to receive a continuous function chart CFC for each system component C of the investigated safety-critical system SYS.

The apparatus 1 further includes a processing unit 3 adapted to generate for each continuous function chart CFC a corresponding component fault tree, CFT, element. Inports and outports of the component fault tree, CFT, elements are generated and interconnected by the processing unit 3 of the apparatus 1 based on unique names of the inputs and outputs of the corresponding continuous function chart CFC of the respective system component C of the investigated safety-critical system SYS. The processing unit 3 is further adapted to generate input failure modes IFM and output failure modes OFM of each generated component fault tree, CFT, element based on generic mapping between connector types of the continuous function chart CFC and failure types of failure modes of the component fault tree element. In a possible embodiment, the processing unit 3 is adapted to perform the generic mapping on the basis of a generic mapping table MT stored in a database 4 as shown in FIG. 1. The processing unit 3 is further adapted to connect for each generated component fault tree, CFT, element of the respective system component C the input failure modes IFM of said component fault tree element to output failure modes OFM of the component fault tree element via internal failure propagation paths based on interconnected function blocks FB of the continuous function chart CFC of the respective system component C of the investigated safety-critical system SYS. In a possible embodiment, the processing unit 3 of the apparatus 1 is adapted to read the interconnected function blocks FB of the continuous function chart CFC from a function block database 5 as shown in FIG. 1. In a possible embodiment, the processing unit 3 is adapted to generate the component fault tree CFT automatically during a runtime of the investigated safety-critical system SYS in response to an observed event. This event may be for instance a failure of at least one system component C of the safety-critical system SYS. The apparatus 1 further includes an output 6 adapted to output the generated component fault tree CFT of the safety-critical system SYS.

As shown in FIG. 1, the output component fault tree CFT of the safety-critical system generated by the apparatus 1 may be supplied to an analyzing unit 7 for further processing. In a possible embodiment, the analyzing unit 7 is adapted to perform a fault tree analysis FTA on the basis of the received component fault tree CFT. In a further possible embodiment, the analyzing unit 7 may also be adapted to perform a root cause analysis RCA on the basis of the received component fault tree CFT. In a possible embodiment, the continuous function chart CFC supplied to the input 2 of the apparatus 1 may include a graphical programming language used for a programmable logic controller PLC for designing complex control and regulation tasks as specified in the IEC 61131-3 standard. Instead of using a sequence of commands in textual notation, function blocks FB of the continuous function chart CFC may be combined and interconnected graphically. These continuous function charts CFC may include diagrams resembling electronic circuit diagrams. The function to be performed by the system may be represented in form of the interconnected graphic elements of the continuous function chart CFC. Since predefined function blocks FB only need to be connected to one another, complex functions may be easily programmed by developers coming from different engineering disciplines. The continuous function chart CFC may consist of function blocks FB and linkages between these function blocks. Each function block FB may include different types of input and output parameters. A function block FB processes the input parameters according to a specific automation function and may produce output parameters for other function blocks FB of the continuous function chart CFC. In a possible embodiment, the automation function of each function block FB may be defined manually by a designer. The outputs of the different function blocks FB may be linked to inputs of other function blocks FB in CFC programs. Accordingly, each linkage may indicate that an input parameter of one function block FB obtains its value from the specific output parameters of at least one other function block FB. CFC diagrams or continuous function charts CFC include a precise syntax and each function block FB has a well-defined semantics. Furthermore, the continuous function chart CFC may be used to generate a source code. The CFC diagrams of a system may be created graphically using tools such as SIBAS.G or SIMATIC S7 among others. SIBAS.G is an engineering tool for the development of software for the vehicle control of trains. SIMATIC S7 is used to design complex control-engineering tasks in the industrial automation domain.

Figure 2:
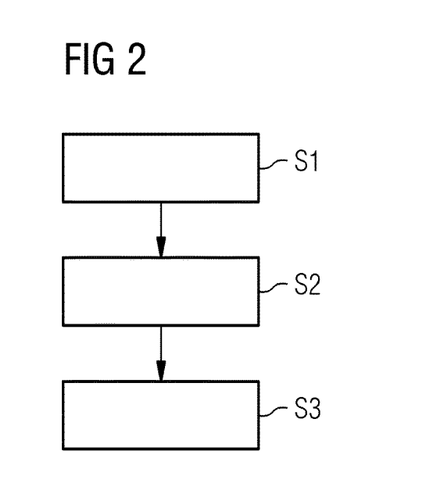
FIG. 2 shows a flowchart of a possible exemplary embodiment of a method for generating automatically a component fault tree of a safety-critical system according to a further aspect.

FIG. 2 shows a flowchart for illustrating an exemplary embodiment of a method for generating automatically a component fault tree CFT of a safety-critical system SYS on the basis of a continuous function chart CFC. As shown in the embodiment of FIG. 2, the method for generating automatically a component fault tree CFT of an investigated safety-critical system SYS may include several acts.

In a first act S1, a continuous function chart CFC for each system component of the investigated safety-critical system SYS may be provided and for each provided continuous function chart a corresponding component fault tree element is automatically generated. The inports and outports of the component fault tree element are generated and interconnected based on unique names of the inputs and outputs of the corresponding continuous function chart CFC of the respective system component. The system component C may be a hardware component of the safety-critical system SYS or a software component of the safety-critical system SYS.

In a further act S2, input failure modes IFM and output failure modes OFM for each generated component fault tree element are generated based on generic mapping between connector types in the continuous function chart CFC and failure types of failure modes of the component fault tree element.

Finally, in act S3, for each generated component fault tree element of the system component C, the input failure modes IFM of the component fault tree element are connected to output failure modes OFM of the same component fault tree element via internal failure propagation paths based on interconnected function blocks FB of the continuous function chart CFC of the respective system component C. After the component fault tree CFT of the safety-critical system SYS has been generated automatically in acts S1 to S3, a fault tree analysis FTA may be performed on the basis of the generated component fault tree CFT. Further, a root cause analysis RCA may be performed on the basis of the generated component fault tree CFT of the investigated system SYS. It is further possible that the automatically generated component fault tree CFT of the investigated system SYS is compared with a component fault tree which has been created manually by a software engineer for verification of the generated component fault tree CFT.

In a further possible embodiment, the component fault tree is generated automatically in acts S1 to S3 as shown in FIG. 2 during a runtime of the safety-critical system SYS in response to an observed event of the safety-critical system SYS. The observed event may for instance include an observed failure of at least one system component C of the investigated safety-critical system SYS.

In a further possible embodiment of the method illustrated in FIG. 2, the function blocks FBs used in act S3 may be read from a function block database. The function block FB of a continuous function chart CFC stored in the function block database 5 may include at least one automation function. The automation function may represent a logical relation between input parameters and output parameters. Further, the automation function may represent a dependency of output parameters from input parameters.

Figure 3:
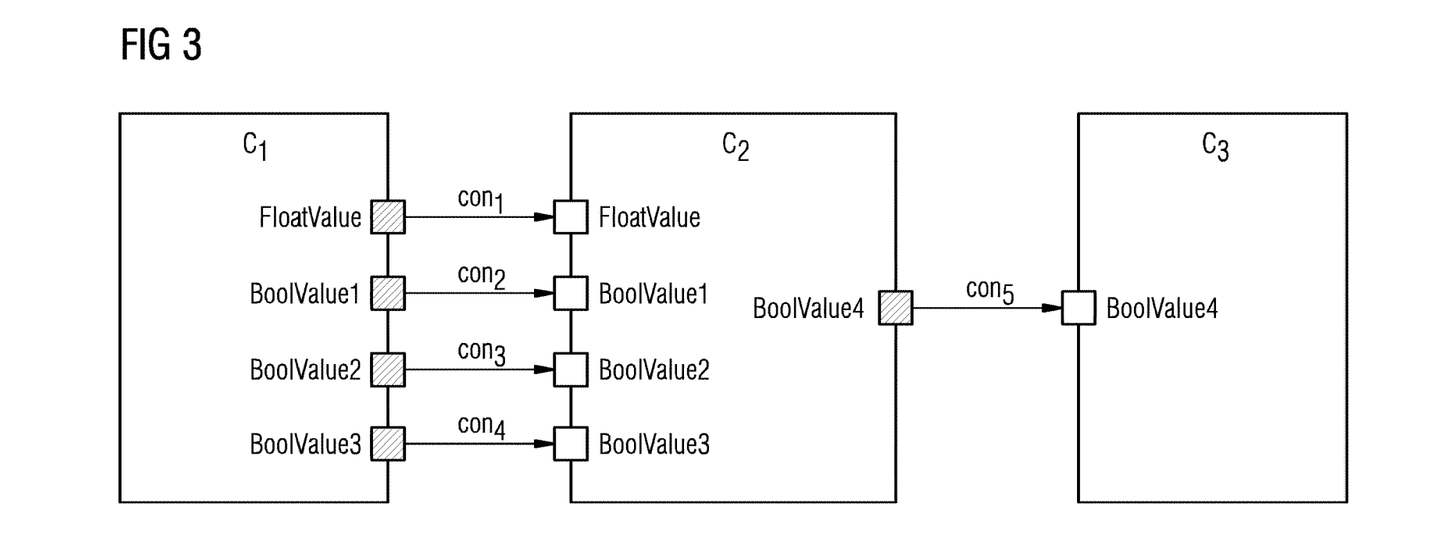
FIG. 3 shows a diagram of a possible exemplary investigated safety-critical system for illustrating the operation of a method and apparatus.

FIG. 3 illustrates an exemplary system S.

The system S consists of a set of components $C=\{c_1, \ldots, c_n\}$. Each system component $c \in C$ includes a set of inports $IN(c)=\{in_1, \ldots, in_p\}$ and a set of outports $OUT(c)=\{out_1, \ldots, out_q\}$. The information flow between the outport of a component $c_i \in C$ and the inport of another component $c_j \in C$ (with $c_i \neq c_j$) is represented by a set of connections.

$$CON=\{(out_x, in_y) | out_x \in OUT(c_i), in_y \in IN(c_j)\}$$

The example system S presented as depicted in FIG. 3 is defined by:

$C=\{c_1, c_2, c_3\}$ IN
$(c_1)=\emptyset$
$IN(c_2)=\{FloatValue, BoolValue1, BoolValue2, BoolValue3\}$ IN
$(c_3)=\{BoolValue4\}$
OUT $(c_1)=\{FloatValue, BoolValue1, BoolValue2, BoolValue3\}$ $OUT(c_2)$
$=\{BoolValue4\}$
$OUT(c_3)=\emptyset$
CON={(FloatValue, FloatValue), (BoolValue1, BoolValue1), (BoolValue2, BoolValue2), (BoolValue3, BoolValue3), (BoolValue4, BoolValue4)}

The behavior of each component $c_i \in C$ is defined by a CFC diagram $cfc_i \in CFC$ with $\tilde{CFC}(c_i)=cfc_i$ and $cfc|=\theta$.

Each CFC may be defined by a tuple $$cfc_i = (FB(cfc_i), LINK(cfc_i), IN(cfc_i), OUT(cfc_i))$$

where $FB(cfc_i)=\{fb_1, \ldots, fb_m\}$ is a set of function blocks, $LINK(cfc_i)$ is a set of linkages, $IN(cfc_i)=IN(c_i)$ is a set of input parameters of the CFC and equals the set of inports of the corresponding component $c_i$, and $OUT(cfc_i)=OUT(c_i)$ is a set of output parameters of the CFC and equals the set of outports of the corresponding component $c_i$.

A function block $fb_i \in FB(cfc_i)$ of a CFC $cfc_i \in CFC$ may be defined as a tuple $$fb_i = (t(fb_i), f(fb_i), IN(fb_i), OUT(fb_i))$$

where $t(fb_i)$ is the unique type of a function block, $f(fb_i)$ is the automation function, $IN(fb_i)=\{in_{i,1}, \ldots, in_{i,u}\}$ is a set of input parameters of the function block FB, and $OUT(fb_i)=\{out_{i,1}, \ldots, out_{i,v}\}$ is a set of output parameters of the function block FB.

A linkage $link_{j,i} \in LINK(cfc_i)$ of a CFC $cfc_i \in CFC$ is a relation $$link_{j,i} = (x_k, y_l) | x_k \in OUT(fb_j) \cup IN(cfc_i), y_l \in IN(fb_i) \cup OUT(cfc_i))$$

where $out_{j,k}$ is either the $k^{th}$ output parameter of function block $fb_j$ or the $k^{th}$ input parameter of the CFC and $in_{i,l}$ is either the $l^{th}$ input parameter of function block $fb_i$ or the $l^{th}$ output parameter of the CFC.

An automation function $f(fb_i)$ of a function block $fb_i \in FB(cfc_i)$ is a relation between its input and output parameters (e.g. logical relations, such as or, and, not, etc.). It may be defined as $f(fb_i) \subseteq (IN(fb_i) \times OUT(fb_i))$, where for all $in_{i,x} \in IN(fb_i)$ and $out_{i,y_1}, out_{i,y_2} \in OUT(fb_i)$, if $(in_{i,x}, out_{i,y_1}) \in f(fb_i)$ and $(in_{i,x}, out_{i,y_2}) \in f(fb_i)$ then $out_{i,y_1}=out_{i,y_2}$.

Each input parameter $in_{i,k} \in IN(fb_i)$ and output parameter $out_{i,l} \in OUT(fb_i)$ of a function block FB $fb_i \in FB(cfc_i)$ has a specific connector type $CTY(x_i)=cty$ with $x_i \in IN(fb_i) \cup OUT(fb_i)$ (e.g. Boolean, integer, etc.). If $link_{j,i}=(x_a, y_b)=(out_{fb_j,a}, in_{fb_i,b})$ then $CTY(out_{fb_j,a})=CTY(in_{fb_i,b})$.

Figure 4:
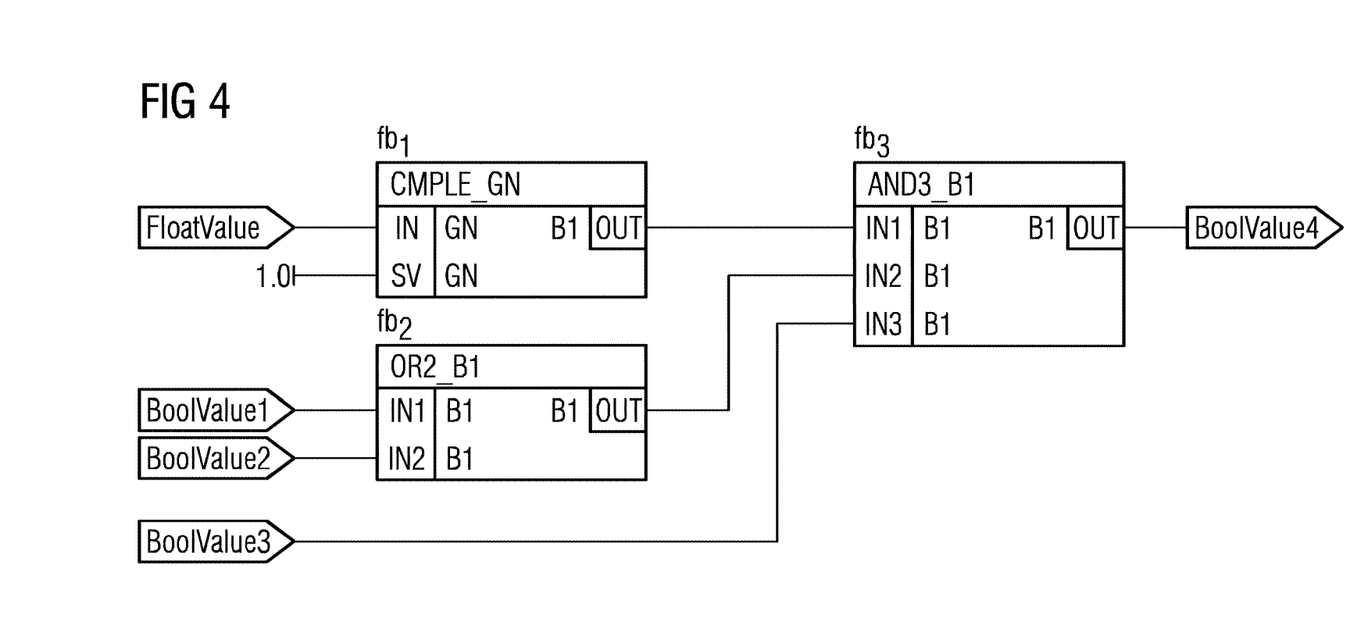
FIG. 4 shows an example of a continuous function chart of a system component of an investigated safety-critical system for illustration of the operation of a method and apparatus.

In the example system S, the CFC diagram $cfc_2$ of component $c_2$ presented in FIG. 4 is defined by:

$FB(cfc_2)=\{fb_1, fb_2, fb_3\}$
$IN(cfc_2)=\{FloatValue, BoolValue1, BoolValue2, BoolValue3\}$ OUT
$(cfc_2)=\{BoolValue4\}$
$LINK(cfc_2)=\{(FloatValue, IN_{1,1}), (BoolValue1, IN1_{2,1}), (BoolValue2, IN2_{2,2}), (OUT1, 1, IN1_{3,1}), (OUT_{2,1}, IN2_{3,1}), (BoolValue3, IN3_{3,3}), (OUT_{3,1}, BoolValue4)\}$
$t(fb_1)=CMPLE\_GN\_IN$
$t(fb_1)=\{IN_{1,1}, SV_{1,2}\}$ $OUT(fb_1)$
$=\{OUT_{1,1}\}$
$t(fb_2)=OR2\_BL$
$IN(fb_2)=\{IN1_{2,1}, IN2_{2,2}\} OUT$
$(fb_2)=\{OUT_{2,1}\} t(fb_3)=AND3\_Bl$
$IN(fb_3)=\{IN1_{3,1}, IN2_{3,2}, IN3_{3,3}\}$ OUT
$(fb_3)=\{OUT_{3,1}\}$
$CTY(IN_{1,1})=CTY(SV_{1,2})=GN$ $CTY$
$(IN1_{2,1})=CTY(IN2_{2,2})=Bl$
$CTY(IN1_{3,1})=CTY(IN2_{3,2})=CTY(IN2_{3,3})=Bl$ $CTY$
$(OUT_{1,1})=CTY(OUT_{2,1})=CTY(OUT_{3,1})=Bl$ If $c_i \in C$ has a component fault tree element $cft_i \in CFT$, then it is $\tilde{CFT}(c_i)=cft_i$ with $cft_i|=\theta$.

Each component fault tree element $cft_i \in CFT(c_i)$ of a component $c_i \in C$ may have input failure modes IFM $(in_k)=\{ifm_1, \ldots, ifm_s\}$ which are related to an inport $in_k \in IN(c_i)$ as well as output failure modes OFM $(out_j)=\{ofm_1, \ldots, ofm_r\}$ which are related to an outport $out_j \in OUT(c_i)$.

In order to specify the semantics of the failure modes within component the fault tree an unambiguous failure type fty is assigned to each input failure mode IFM and output failure mode OFM. The different failure types as well as the relation between them are specified in a so-called failure type system T:

$$FTY(fm) = fty$$

$$\text{with } fm \in \bigcup_{i=1}^{p} IFM(in_i) \cup \bigcup_{j=1}^{q} OFM(out_j)$$

$$\text{and } fty \in T$$

Moreover, each CFT element CFT $(c_i)/=\theta$ of a component $c_i \in C$ may have a set of gates $G=\{g_1, \ldots, g_r\}$. Each gate $g_i \in G$ has exactly one output $g_i.out$, one or more inputs $g_i.IN=\{g_i.in_1, \ldots, g_i.in_s\}$, and a Boolean formula b (e.g. $g.out=g.in_1 \vee g.in_2$).

Input failure modes IFM and output failure modes OFM as well as gates are connected by a set of directed edges.

$$E \subseteq \{(out_x, in_y) | out_x \in IFM(in_1) \cup \ldots \cup IFM(in_p) \cup g_1.out \cup \ldots \cup g_r.out,$$

$$in_y \in g_1.IN \cup \ldots \cup g_r.IN \cup OFM(out_1) \cup \ldots \cup OFM(out_q)\}$$

The generation of a CFT from a CFC diagram may be performed in three subacts, which are defined as follows:

At first, a CFT element is created for each CFC diagram within a specific project:

$$\forall cfc_i \in CFC \text{ with } cfc_i = \tilde{CFC}(c_i) : \tilde{CFT}(c_i) = cft_i \quad (1)$$

Thus, $\forall c_i \in C : \exists cft_i \in CFT$.

Moreover, based on the inputs and outputs defined in each CFC diagram, inports and outports are generated and interconnected based on the unique names of the inputs and outputs of the CFC diagrams:

$$\forall cfc_i \in CFC : IN(c_i) \rightarrow IN(cfc_i) \quad (2)$$

$$\forall cfc_i \in CFC : OUT(c_i) \rightarrow OUT(cfc_i) \quad (3)$$

and $$\forall cfc_i, cfc_j \in CFC \text{ with } cfc_i|=cfc_j : \forall out_{i,k} \in OUT(cfc_i), in_{j,l} \in IN(cfc_j) : \rightarrow$$

$$\{(out_{i,k}, in_{j,l}) | name(out_{i,k}) = name(in_{j,l})\} \quad (4)$$

Figure 5:
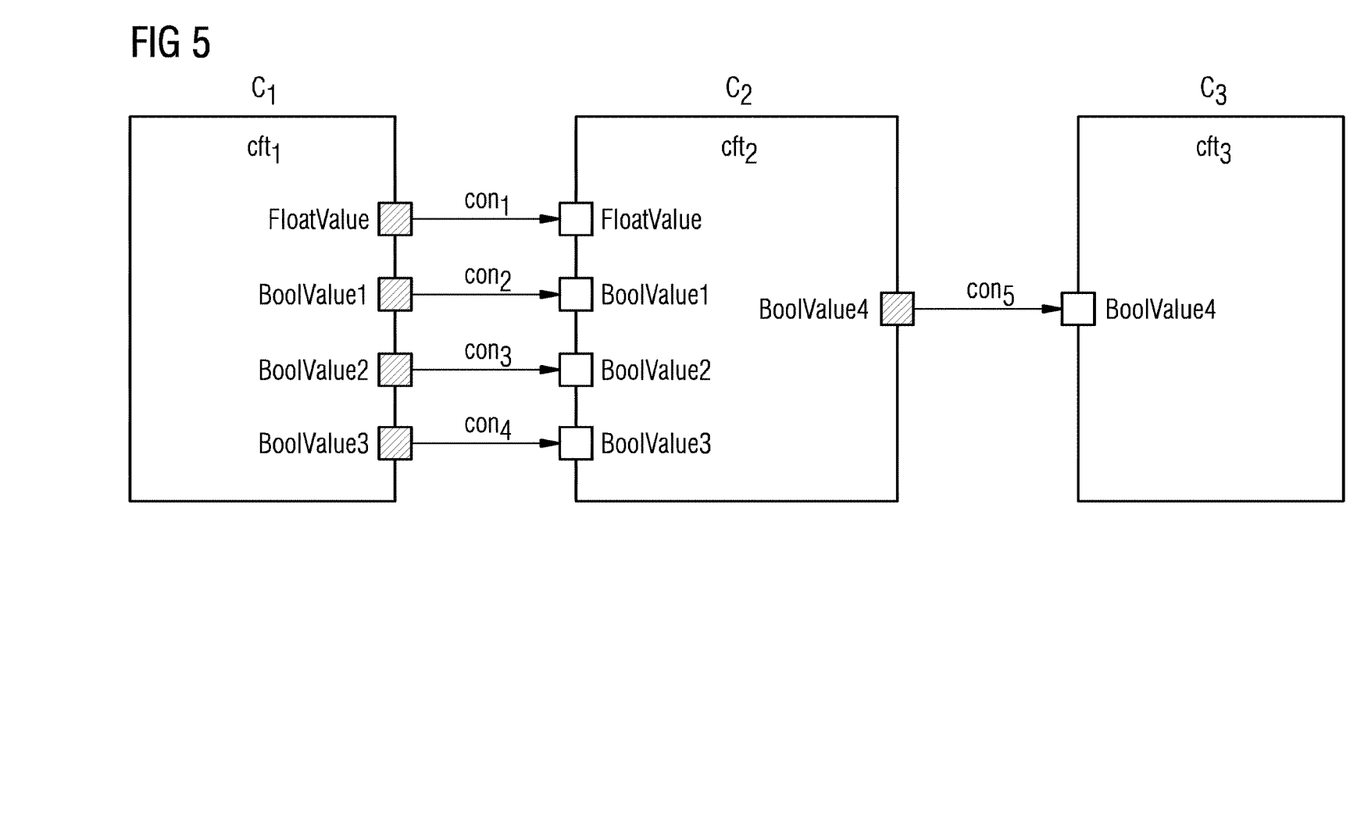
FIG. 5 shows schematically the CFT elements for the exemplary investigated safety-critical system of FIG. 3 generated according to the method and apparatus.

For the exemplary system S as depicted in FIG. 3 and FIG. 4, the following CFT elements are generated (see FIG. 5):

$\tilde{CFT}(c_1)=cft_1 \tilde{CF}$
$T(c_2)=cft_2 \tilde{CFT}$
$(c_3)=cft_3$
$IN(cfc_2)=\{FloatValue, BoolValue1, BoolValue2, BoolValue3\}$ OUT
$(cfc_2)=\{BoolValue4\}$
$CON=\{(FloatValue, FloatValue), (BoolValue1, BoolValue1), (BoolValue2, BoolValue2), (BoolValue3, BoolValue3), (BoolValue4, BoolValue4)\}$ In the next act, the input failure modes IFM and output failure modes OFM are generated for each of the previously created CFT elements.

The generation of the in- & output failure modes is based on a generic mapping between the connector types in the CFC diagram and the failure types of the failure modes in the CFT element. Each connector type corresponds to a set of failure types from the generic failure type system T:

$$\text{MAP}:CTY(x_i)l \to \{fty_1, \ldots, fty_n\} \in T \quad (5)$$

with $xi \in \text{IN}(cft_i) \cup \text{OUT}(cft_i)$ and $cft_i \in CFT$ and $fty_j \in T$.

The generic mapping from connector types IN CFCs to failure types in CFTs is presented in the following Table: For each CFT element $cft_i \in CFT$, a set of input failure

| Connector Type | Failure Type |
|---|---|
| Boolean | false positive, false negative, omission, commission, too early, too late |
| Integer, Float, Time | too high, too low, omission, commission, too early, too late |

Modes IFM and a set of output failure modes OFM are generated based on the connector types of the inputs IN ($cfc_i$) and outputs OUT ($cfc_i$) of the corresponding CFC diagram $cfc_i \in CFc$, where $cfc_i = \tilde{CFC}(c_i)$ and $cft_i = \tilde{CFT}(c_i)$ with $ci \in C$:

$$\forall cfc_i \in CFC: \forall in_j \in \text{IN}(cfc_i): \to$$

$$\{ifm_k | \text{MAP}(CTY(in_j)) = FTY(ifm_k)\} \quad (6)$$

and $$\forall cfc_i \in CFC: \forall out_j \in \text{OUT}(cfc_i): \to$$

$$\{ofm_k | \text{MAP}(CTY(out_j)) = FTY(out_k)\} \quad (7)$$

Figure 6:
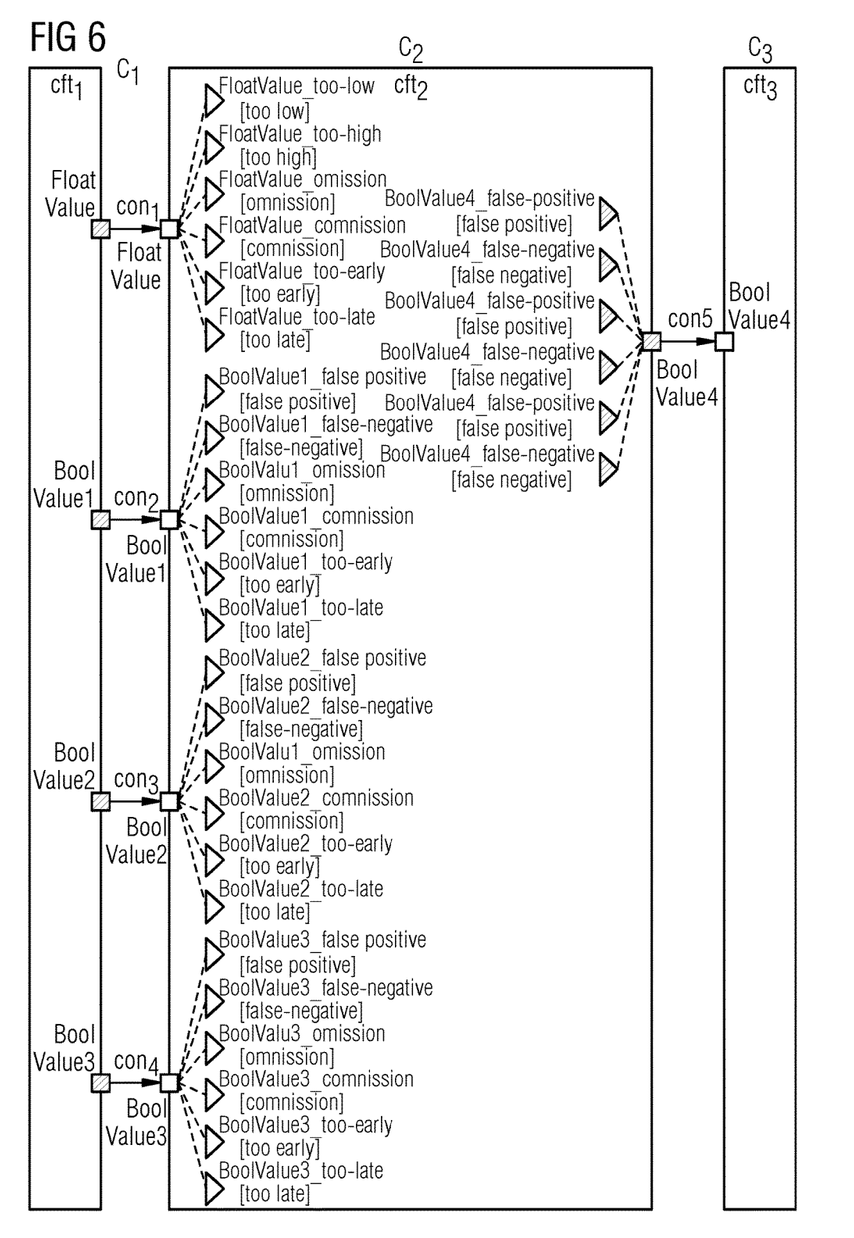
FIG. 6 illustrates the generated input and output failure modes of the exemplary investigated safety-critical system to illustrate the operation of the method and apparatus.

For the component $c_2$ of the exemplary system S as depicted in FIG. 3 and FIG. 4, the following input and output failure modes are generated (see FIG. 6):

IFM(FloatValue)={FloatValue too-low, FloatValue too-high, FloatValue omission, FloatValue commission, FloatValue too-early, FloatValue too-late}

IFM(BoolValue1)={BoolValue1 false-positive, BoolValue1 false-negative BoolValue1 omission, BoolValue1 commission, BoolValue1 too-early, BoolValue1 too-late}

IFM(BoolValue2)={BoolValue2 false-positive, BoolValue2 false-negative BoolValue2 omission, BoolValue2 commission, BoolValue2 too-early, BoolValue2 too-late}

IFM(BoolValue3)={BoolValue3 false-positive, BoolValue3 false-negative BoolValue3 omission, BoolValue3 commission, BoolValue3 too-early, BoolValue3 too-late}

OFM(BoolValue4)={BoolValue4 false-positive, BoolValue4 false-negative BoolValue4 omission, BoolValue4 commission, BoolValue4 too-early, BoolValue4 too-late} with

FTY(FloatValue too-low)=too low FTY (FloatValue too-high)=too high FTY (FloatValue omission)=omission
FTY (FloatValue commission)=commission
FTY (FloatValue too-early)=too early
FTY (FloatValue too-late)=too late
FTY (BoolValue1 false-positive)=false positive FTY (BoolValue1 false-negative)=false negative FTY (BoolValue1 omission)=omission
FTY (BoolValue1-commission)=commission
FTY(BoolValue1-too-early)=too early
FTY(BoolValue1⁻too-late)=too late
FTY(BoolValue2 false-positive)=false positive FTY (BoolValue2 false-negative)=false negative FTY (BoolValue2 omission)=omission
FTY (BoolValue2⁻commission)=commission
FTY (BoolValue2⁻too-early)=too early
FTY (BoolValue2⁻too-late)=too late
FTY (BoolValue3 false-positive)=false positive FTY (BoolValue3 false-negative)=false negative FTY (BoolValue3 omission)=omission
FTY (BoolValue3⁻commission)=commission
FTY(BoolValue3⁻too-early)=too early
FTY(BoolValue3⁻too-late)=too late
FTY (BoolValue4 false-positive)=false positive FTY (BoolValue4 false-negative)=false negative FTY (BoolValue4 omission)=omission
FTY (BoolValue4⁻commission)=commission
FTY (BoolValue4⁻too-early)=too early
FTY (BoolValue4⁻too-late)=too late In a last subact, the failure propagation from the input failure modes IFM of each CFT element $cft_i \in CFT$ to its output failure modes OFM is generated based on the definition of the corresponding CFC diagram $cfc_i = \tilde{CFC}(c_i) \in CFC$.

Therefore, input and output failure modes of the CFT element $cft_i$ may be connected using Boolean gates.

At first, the a set of Boolean gates G is generated based on specific predefined rules for each function block $fb_j \in FB$ ($cfc_i$). Therefore, a set of rules $R(t(fb_i)) = \{r_1, \ldots, r_s\}$ is defined for each type of function block $t$ ($fb_j) \in FB(cfc_i)$ in the CFC which describes how all possible failure types of the output parameter of a function block FB are related to the possible failure types its input parameters:

• $cfc_i \in CFC: \forall fb_j \in FB(cfc_i): \forall out_{k,l} \in \text{OUT}(fb_j):$ $$R(t(fb_j)) = \{r_i | r_i: \text{MAP}(CTY(out_{k,l}))l \to \\ \text{MAP}(CTY(in_{k,1})) \circ \ldots \circ \text{MAP}(CTX(n_{k,u}))\} \quad (8)$$

with $\circ = \{\neg, \wedge, \vee, \oplus\}$
and $i=1, \ldots, |\text{MAP (CTY (out}_{k,l}))|$ The possible failure types of the input and output parameters of a function block FB in the CFC are defined by their connector type according to the mapping MAP (see above Table). For instance, if the connector type of the output parameter is a Boolean, two rules must be defined: one for the failure type false negative and one rule for the failure type false positive.

In case that no rule is predefined for a type of function block $fb_j \in FB(cfc_i)$ used in the CFC diagram $cfc_i \in CFC$, only the worst case scenario for the failure propagation may be assumed. This worst case scenario is defined as follows:

$$\forall out_{k,l} \in \text{OUT}(fb_j): \quad (9)$$

$R(\text{worst case}) =$ $$\left\{ r_i \,\middle|\, r_i: \text{MAP}(CTY(out_{k,l})) \mapsto \bigvee_{s=1}^{u} \text{MAP}(CTY(in_{k,t})) \right\}$$

with $i = 1, \ldots, |\text{MAP}(CTY(out_{k,l}))|$

For the function blocks FB of component $c_2$ in our exemplary system as depicted in FIG. 4, the following rules are defined:

R(CMPLE GN)={OUT.false-positive=IN.too-low, OUT.false-negative=IN.too-high}OUT.omission= IN.omission} OUT.commission=IN.commission}OUT.too-early=IN.too-early}OUT.too-late=IN.too-late}

R[OR2 Bl]={OUT.false-positive=IN1.false-positive ∨ IN 2.false-positive, OUT.false-negative=IN1.false-negative ∧ IN2.false-negative} OUT.omission=IN 1.omission ∧ IN 2.omission}OUT.commission=IN 1.commission ∨ IN 2.commission} OUT.too-early=IN1.too-early ∨ IN 2.too-early}OUT.too-late=IN1.too-late ∧ IN2.false-late}

R(AND3 Bl)={OUT.false-positive=IN1.false-positive ∧ IN2.false-positive ∧ IN 3.false-positi OUT.false-negative=IN1.false-positive ∨ IN2.false-positive ∨ IN3.false-positiv OUT.omission=IN 1.omission ∧ IN 2.omission ∧ IN 3.omission} OUT.commission=IN 1.commission ∨ IN 2.commission ∨ IN 3.commission} OUT.too-early=IN1.too-early ∨ IN2.too-early ∨ IN3.too-early}OUT.too-late=IN1.too-late ∧ IN2.false-late ∧ IN 3.too-late}

Based on these predefined rules, the following Boolean gates are generated for the CFT element $cft_2$ of component $c_2$:

AND1-1=AND1-2=AND1-3=(AND.out, {AND.in$_1$, AND.in$_2$, AND.in$_3$},
AND.out=AND.in$_1$ ∧ AND.in$_2$ ∧ AND.in$_3$)
AND2-1=AND2-2=AND2-3=(AND.out, {AND.in$_1$, AND.in$_2$},
AND.out=AND.in$_1$ ∧ AND.in$_2$)
OR1-1=OR1-2=OR1-3=(OR.out, {OR.in$_1$, OR.in$_2$, OR.in$_3$},
OR.out=OR.in$_1$ ∨ OR.in$_2$ ∨ OR.in$_3$)
OR2-1=OR2-2=OR2-3=(OR.out, {OR.in$_1$, OR.in$_2$},
OR.out=OR.in$_1$ ∨ OR.in$_2$)

Afterwards, the input failure modes IFM and output failure modes OFM as well as the Boolean gates of each CFT element $cft_i \in CFT$ are interconnected according to the corresponding CFC's linkage LINK($cfc_i$). For creating the interconnections, the process starts from the output failure modes OFMs and connects them with the available input failure modes IFMs through the Boolean gates. Therefore, a set of direct edges is created automatically as follows:

$\forall out_j \in OUT(cfc_i): \forall \forall ofm_k \in OFM(out_j):$ $\rightarrow \{(x, ofm_k) | x \in IFM(in_l) \lor x = g_r.out,$ $\exists link_z \in LINK(cfc_i) = (y, OUT(cfc_i)), y = in_l \lor y \cup$ $OUT(fb_d), fb_s \Rightarrow g_r\}$ (10)

and $\forall g_j.IN \in G: \forall g_j.in_k \in g_j.IN:$ $\rightarrow \{(x, g_j.in_k) | x \in IFM(in_l) \lor x = g_r.out, g_r.l = g_j$ $\exists link_z \in LINK(cfc_i) = (y, OUT(cfc_i)), y = in_l \lor y$ $\cup OUT(fb_s), fb_s \Rightarrow g_r\}$ (11)

For the second component $c_2$ in the exemplary system S, the following connections are created within the CFT element ($cft_2$):
E={(AND1-1$^-$.out, BoolValue4 false-positive), (OR1-1$^-$.out, BoolValue4 false-negative),
(AND1.2$^-$.out, BoolValue4 commission), (OR1-2$^-$.out, BoolValue4 omission),
(AND1-3$^-$.out, BoolValue4 too-early), (OR1-3$^-$.out, BoolValue4 too-late),
(FloatValue too-low, AND1-1$^-$.in$_1$), (OR2-1.out, AND1-1.in$_2$),
(BoolValue3 false-positive, AND1-1$^-$.in$_3$),
(FloatValue commission, AND1-2$^-$.in$_1$), (OR2-2.out, AND1-2.in$_2$),
(BoolValue3 commission, AND1-2$^-$.in$_3$),
(FloatValue too-early, AND1-3$^-$.in$_1$), (OR2-3.out, AND1-3.in$_2$),
(BoolValue3 too-early, AND1-3$^-$.in$_3$),
(FloatValue too-high, OR1-1$^-$.in$_1$), (AND2-1.out, OR1-1.in$_2$),
(BoolValue3 false-negative, OR1-1$^-$.in$_3$),
(FloatValue omission, OR1-2$^-$.in$_1$), (AND2-2.out, OR1-2.in$_2$), (BoolValue3 omission, OR1-2$^-$.in$_3$),
(FloatValue too-late, OR1-3$^-$.in$_1$), (AND2-3.out, OR1-3.in$_2$), (BoolValue3 too-late, OR1-3$^-$.in$_3$),
(BoolValue false-positive, OR2-1$^-$.in$_1$), (BoolValue2 false-positive, OR2-1$^-$.in$_2$),
(BoolValue1 commission, OR2-2$^-$.in$_1$), (BoolValue2 commission, OR2-2$^-$.in$_2$),
(BoolValue1 too-early, OR2-3$^-$.in$_1$), (BoolValue2 too-early, OR2-3$^-$.in$_2$),
(BoolValue1 false-negative, AND2-1$^-$.in$_1$), (BoolValue2 false-negative, AND2-1$^-$.in$_2$),
(BoolValue1 omission, AND2-2$^-$.in$_1$), (BoolValue2 omission, AND2-2$^-$.in$_2$),
(BoolValue1 too-late, AND2-3$^-$.in$_1$), (BoolValue2 too-late, AND2-2$^-$.in$_2$)}

Figure 7:
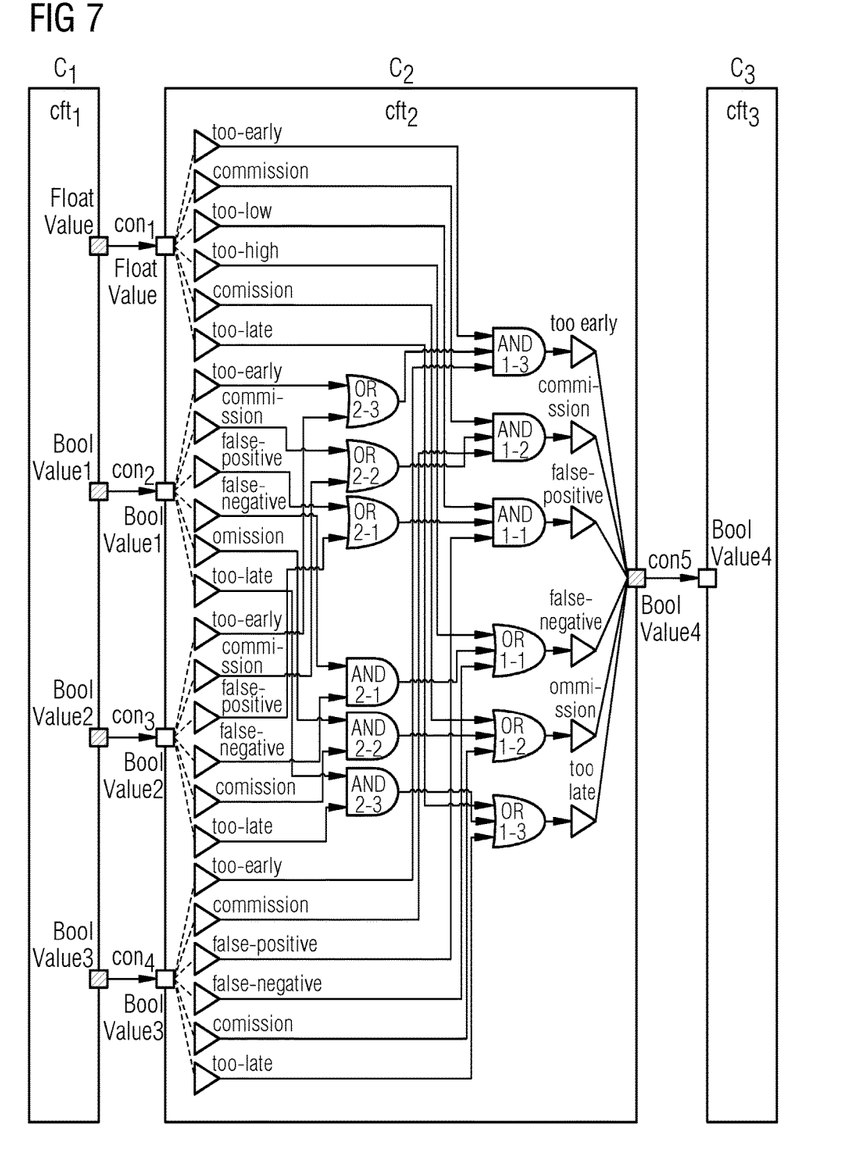
FIG. 7 shows schematically the generated CFT element for a system component of the investigated safety-critical system to illustrate the operation of the method and apparatus.

The result of the generation process for the exemplary system S is shown in FIG. 7.

The method and apparatus may be provided for generating automatically a component fault tree CFT of a safety-critical system in different technical domains. By generating a component fault tree CFT from a continuous function chart CFC a failure propagation model is created automatically without any manual effort. The resulting component fault tree CFT may be used for fault tree analysis FTA or root cause analysis RCA of the overall investigated system SYS including also software components. Thus, the accuracy of a safety analysis of the investigated safety-critical system SYS is significantly increased without additional effort for the construction and maintenance of the safety analysis model, in particular for the software components of the respective system. Compared to conventional methods for analysis of components, in particular software components such as root cause analysis or fault injection tests, in which the quality of the results depends on the accuracy of the input data which are generated manually by a team of experts, for instance by brainstorming, the method and apparatus provide a complete set of input data without any additional manual effort. Moreover, the automatically generated component fault tree CFT may be compared to a component fault tree created manually by a safety engineer during system specification. Hence, it is possible also to verify the generated component fault tree CFT if the failure propagation model specified during system design is built correctly in terms of consistency and completeness.

With the method and apparatus, the verification whether a software component has been implemented correctly may be performed. Since the component fault tree CFT generated from the continuous function chart CFC provides an additional view on the implementation, the components and/or the complete investigated system SYS are compared with the correctly defined specification similar to the testing of a normal system behavior. The specified failure propagation model of the component fault tree CFT may be generated from a detailed software specification of the device under test. Hence, a testing scope of an implemented software component may be easily extended.

Further, the generated component fault tree data model may be used to determine the effects for the failure modes of a failure mode and effects analysis FMEA. Therefore, it is also possible either to fill the effects column of the FMEA sheet automatically for the given failure modes or to verify the effects in a filled FMEA sheet.

The generated component fault tree CFT forms a Boolean data model associated to system components C of the investigated system SYS. In a component fault tree, a separate component fault tree element is related to each system component. Failures that are visible at the output of a system component C may be modelled using output failure modes OFM which are related to a specific outport. To model how specific failures propagate from an inport of a component C to an outport, input failure modes IFM are used. The internal failure behavior that also influences the output failure modes OFM may be modeled using Boolean gates such as OR and AND as well as so-called basic events BE. Every component fault tree CFT may be transformed to a classic fault tree by removing the input and output failure mode elements. In both trees, top events TE or output events may be modelled as well. The component fault tree data model CFT allows additionally to the Boolean formula that are also modelled within the classic fault tree to associate the specific top events TE to the corresponding ports where the failures may appear.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for automatically generating a component fault tree of a safety-critical system, the method comprising:
   providing a continuous function chart for each system component of the safety-critical system and automatically generating for each provided continuous function chart a corresponding component fault tree element, wherein inports and outports of each component fault tree element are generated and interconnected based on unique names of inputs and outputs of the corresponding continuous function chart of the respective system component;
   generating, by a processor, input failure modes and output failure modes for each generated component fault tree element based on generic mapping between connector types in the continuous function chart and failure types of failure modes of the respective component fault tree element; and
   connecting, by the processor, for each generated component fault tree element of the system component the input failure modes of the respective component fault tree element to output failure modes of the respective component fault tree element via internal failure propagation paths based on interconnected function blocks of the continuous function chart of the respective system component,
   wherein the component fault tree is automatically generated during runtime of the safety-critical system in response to an observed event;
   wherein the observed event comprises a failure of at least one of the system components.

2. The method of claim 1, wherein the safety-critical system comprises software components, hardware components, or software components and hardware components.

3. The method of claim 1, further comprising performing a fault tree analysis based on the generated component fault tree.

4. The method of claim 1, further comprising performing a root cause analysis based on the generated component fault tree.

5. The method of claim 1, wherein the automatically generated component fault tree is compared with a component fault tree manually created for verification of the automatically generated component fault tree.

6. The method of claim 1, wherein the component fault tree is also generated automatically during design of the safety-critical system.

7. The method of claim 1, wherein the generic mapping is performed using a generic mapping table stored in a database.

8. The method of claim 1, wherein the interconnected function blocks of the continuous function chart are read from a function block database.

9. The method of claim 8, wherein a function block of a continuous function chart stored in the function block database comprises at least one automation function representing a logical relation between input parameters and output parameters, a dependency of output parameters from input parameters, or a combination thereof.

10. An apparatus for automatically generating a component fault tree of an investigated safety-critical system, the apparatus comprising:
    an input configured to receive a continuous function chart for each component of the investigated safety-critical system;
    a processor configured to automatically generate for each continuous function chart a corresponding component fault tree element, wherein inports and outports of each component fault tree element are generated and interconnected based on unique names of inputs and outputs of the corresponding continuous function chart of the respective system component, wherein the processor is further configured to generate input failure modes and output failure modes of each generated component fault tree element based on generic mapping between connector types of the continuous function chart and failure types of failure modes of the respective component fault tree element, and wherein the processor is further configured to connect for each generated component fault tree element of the system component the input failure modes of the respective component fault tree element to output failure modes of the respective component fault tree element via internal failure propagation paths based on interconnected function blocks of the continuous function chart of the respective system component;

an output configured to output the generated component fault tree of the safety-critical system, wherein the processor is further configured to automatically generate the component fault tree during runtime of the safety-critical system in response to an observed event;

wherein the observed event comprises a failure of at least one of the system components.

11. The apparatus of claim 10, wherein the output component fault tree of the safety-critical system is supplied to an analysis unit configured to perform a fault tree analysis, a root cause analysis based on the component fault tree, or a combination thereof.

12. The apparatus of claim 10, wherein the processor is further configured to perform the generic mapping based on a generic mapping table stored in a database.

13. The apparatus of claim 10, wherein the processor is further configured to read the interconnected function blocks of the continuous function chart from a function block database.

14. A safety-critical system comprising:
an apparatus configured to automatically generate a component fault tree of the safety-critical system, the apparatus comprising:
an input configured to receive a continuous function chart for each system component of the safety-critical system,
a processor configured to automatically generate for each continuous function chart a corresponding component fault tree element,
wherein inports and outports of each component fault tree element are generated and interconnected based on unique names of inputs and outputs of the corresponding continuous function chart of the respective system component,
wherein the processor is further configured to generate input failure modes and output failure modes for each generated component fault tree element based on generic mapping between connector types in the continuous function chart and failure types of failure modes of the respective component fault tree element, and
wherein the processor is further configured to connect for each generated component fault tree element of the system component the input failure modes of the respective component fault tree element to output failure modes of the respective component fault tree element via internal failure propagation paths based on interconnected function blocks of the continuous function chart of the respective system component, and
wherein the processor is further configured to generate and evaluate the component fault tree of the safety-critical system during runtime of the safety-critical system in response to an observed failure of at least one of the system components of the safety-critical system.

* * * * *